US009265081B2

(12) United States Patent
Jain et al.

(10) Patent No.: US 9,265,081 B2
(45) Date of Patent: *Feb. 16, 2016

(54) MEDIA EXPOSURE AND VERIFICATION UTILIZING INDUCTIVE COUPLING

(71) Applicant: The Nielsen Company (US), LLC, Schaumburg, IL (US)

(72) Inventors: Anand Jain, Ellicott City, MD (US); John Stavropoulos, Edison, NJ (US); Alan Neuhauser, Silver Spring, MD (US); Wendell Lynch, East Lansing, MI (US); Vladimir Kuznetsov, Ellicott City, MD (US); Jack Crystal, Owings Mills, MD (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/629,025

(22) Filed: Feb. 23, 2015

(65) Prior Publication Data
US 2015/0173117 A1    Jun. 18, 2015

Related U.S. Application Data

(63) Continuation of application No. 13/327,993, filed on Dec. 16, 2011, now Pat. No. 8,977,194.

(51) Int. Cl.
H04B 5/00      (2006.01)
H04W 76/02    (2009.01)
H04W 4/00     (2009.01)

(52) U.S. Cl.
CPC ........... *H04W 76/023* (2013.01); *H04B 5/0031* (2013.01); *H04B 5/0075* (2013.01); *H04W 4/008* (2013.01); *H04B 5/0037* (2013.01); *H04B 5/0068* (2013.01)

(58) Field of Classification Search
USPC ......... 455/405–408, 414.1–414.4, 41.1–41.2, 455/67.11, 67.13, 68, 69; 725/9–21; 705/14.4, 14.44, 14.49, 14.51–14.56
See application file for complete search history.

(56) References Cited

U.S. PATENT DOCUMENTS

| | | |
|---|---|---|
| 3,906,460 A | 9/1975 | Halpern |
| 4,450,431 A | 5/1984 | Hochstein |
| 4,600,829 A | 7/1986 | Walton |
| 4,695,879 A | 9/1987 | Weinblatt |
| 4,803,625 A | 2/1989 | Fu et al. |
| 4,930,011 A | 5/1990 | Kiewit |

(Continued)

FOREIGN PATENT DOCUMENTS

| | | |
|---|---|---|
| AU | 2003253598 | 11/2003 |
| CN | 1653754 | 8/2005 |

(Continued)

OTHER PUBLICATIONS

United States Patent and Trademark Office, Non-Final Office action, issued in connection with U.S. Appl. No. 13/327,993, mailed on Jun. 7, 2013, 10 pages.

(Continued)

Primary Examiner — Tuan A Tran
(74) Attorney, Agent, or Firm — Hanley, Flight & Zimmerman, LLC

(57) ABSTRACT

Examples disclosed herein collect research data relating to media received in a computer processing device. The research data includes a cookie associated with accessing the media. Examples disclosed herein present a message requesting communicative coupling of a portable computing device to the computer processing device when the portable computing device is not inductively coupled to the computer processing device. Examples disclosed herein receive information from the portable computing device via an inductive connection when it is detected that the portable computing device is coupled to the computer processing device. The information is indicative of a user of the portable computing device. The information is associated to the research data.

26 Claims, 6 Drawing Sheets

(56) References Cited

U.S. PATENT DOCUMENTS

| | | | |
|---|---|---|---|
| 5,436,653 A | 7/1995 | Ellis et al. |
| 5,450,490 A | 9/1995 | Jensen et al. |
| 5,481,294 A | 1/1996 | Thomas et al. |
| 5,483,276 A | 1/1996 | Brooks et al. |
| 5,497,185 A | 3/1996 | Dufresne et al. |
| 5,550,928 A | 8/1996 | Lu et al. |
| 5,579,124 A | 11/1996 | Aijala et al. |
| 5,594,934 A | 1/1997 | Lu et al. |
| 5,737,026 A | 4/1998 | Lu et al. |
| 5,748,104 A | 5/1998 | Argyroudis et al. |
| 5,764,763 A | 6/1998 | Jensen et al. |
| 5,872,588 A | 2/1999 | Aras et al. |
| 5,917,425 A | 6/1999 | Crimmins et al. |
| 6,353,929 B1 | 3/2002 | Houston |
| 6,539,393 B1 | 3/2003 | Kabala |
| 6,564,104 B2 | 5/2003 | Nelson et al. |
| 6,572,560 B1 | 6/2003 | Watrous et al. |
| 6,647,548 B1 | 11/2003 | Lu et al. |
| 6,661,438 B1 | 12/2003 | Shiraishi et al. |
| 6,845,360 B2 | 1/2005 | Jensen et al. |
| 6,871,180 B1 | 3/2005 | Neuhauser et al. |
| 6,893,396 B2 | 5/2005 | Schulze et al. |
| 6,990,453 B2 | 1/2006 | Wang et al. |
| 7,102,640 B1 | 9/2006 | Aholainen et al. |
| 7,155,159 B1 | 12/2006 | Weinblatt et al. |
| 7,181,159 B2 | 2/2007 | Breen |
| 7,254,406 B2 | 8/2007 | Beros et al. |
| 7,460,827 B2 | 12/2008 | Schuster et al. |
| 7,471,987 B2 | 12/2008 | Crystal et al. |
| 7,483,975 B2 | 1/2009 | Kolessar et al. |
| 7,627,477 B2 | 12/2009 | Wang et al. |
| 7,770,193 B2 | 8/2010 | Lee |
| 7,889,686 B1 | 2/2011 | Chang et al. |
| 7,908,133 B2 * | 3/2011 | Neuhauser ............ G10L 19/018 704/203 |
| 8,023,882 B2 | 9/2011 | Croy et al. |
| 8,036,600 B2 | 10/2011 | Garrett et al. |
| 8,180,376 B1 * | 5/2012 | Merritt ................ H04W 24/10 455/456.2 |
| 8,185,351 B2 * | 5/2012 | Crystal ................ G06Q 10/00 702/186 |
| 8,209,434 B2 | 6/2012 | Wendelrup et al. |
| 8,225,342 B2 | 7/2012 | Mears et al. |
| 8,326,212 B2 * | 12/2012 | Ramaswamy ..... G06Q 30/0201 235/380 |
| 8,335,473 B2 | 12/2012 | Liao |
| 8,538,333 B2 | 9/2013 | Jain et al. |
| 8,549,552 B2 * | 10/2013 | Ramaswamy ......... H04R 29/00 381/56 |
| 8,555,304 B2 | 10/2013 | Mears et al. |
| 8,572,640 B2 * | 10/2013 | Kolessar ............... H04H 60/58 725/19 |
| 8,666,303 B2 * | 3/2014 | Ramaswamy ..... G06Q 30/0201 235/380 |
| 8,849,182 B2 * | 9/2014 | Neuhauser ............ B42D 15/00 434/308 |
| 8,977,194 B2 | 3/2015 | Jain et al. |
| 2002/0045519 A1 | 4/2002 | Watterson et al. |
| 2002/0083060 A1 | 6/2002 | Wang et al. |
| 2002/0129360 A1 | 9/2002 | Lee |
| 2002/0138848 A1 | 9/2002 | Alao et al. |
| 2002/0143577 A1 | 10/2002 | Shiffman et al. |
| 2002/0178220 A1 | 11/2002 | Smith et al. |
| 2003/0032409 A1 | 2/2003 | Hutcheson et al. |
| 2003/0163831 A1 | 8/2003 | Gall et al. |
| 2003/0171833 A1 | 9/2003 | Crystal et al. |
| 2004/0005900 A1 | 1/2004 | Zilliacus |
| 2004/0010418 A1 | 1/2004 | Buonocore et al. |
| 2004/0019463 A1 | 1/2004 | Kolessar et al. |
| 2004/0058675 A1 | 3/2004 | Lu et al. |
| 2004/0109061 A1 | 6/2004 | Walker et al. |
| 2004/0203362 A1 | 10/2004 | Pattabiraman et al. |
| 2004/0252816 A1 | 12/2004 | Nicolas |
| 2005/0006466 A1 | 1/2005 | Overhultz et al. |
| 2005/0120389 A1 | 6/2005 | Boss et al. |
| 2005/0172021 A1 | 8/2005 | Brown |
| 2005/0216509 A1 | 9/2005 | Kolessar et al. |
| 2006/0101116 A1 | 5/2006 | Rittman et al. |
| 2006/0168613 A1 | 7/2006 | Wood et al. |
| 2006/0242325 A1 | 10/2006 | Ramaswamy et al. |
| 2007/0232232 A1 | 10/2007 | Matsuo et al. |
| 2007/0237102 A1 | 10/2007 | Trott |
| 2007/0266395 A1 | 11/2007 | Lee et al. |
| 2007/0288277 A1 | 12/2007 | Neuhauser et al. |
| 2007/0288476 A1 | 12/2007 | Flanagan, III et al. |
| 2007/0294132 A1 | 12/2007 | Zhang et al. |
| 2007/0294705 A1 | 12/2007 | Gopalakrishnan et al. |
| 2007/0294706 A1 | 12/2007 | Neuhauser et al. |
| 2008/0033903 A1 | 2/2008 | Carol et al. |
| 2008/0059988 A1 | 3/2008 | Lee et al. |
| 2008/0086533 A1 | 4/2008 | Neuhauser et al. |
| 2008/0091087 A1 | 4/2008 | Neuhauser et al. |
| 2008/0109295 A1 | 5/2008 | McConochie et al. |
| 2008/0112346 A1 | 5/2008 | Tolpin et al. |
| 2008/0204273 A1 | 8/2008 | Crystal et al. |
| 2008/0243590 A1 * | 10/2008 | Rich ..................... G06Q 30/02 705/7.32 |
| 2009/0037575 A1 | 2/2009 | Crystal et al. |
| 2009/0169024 A1 | 7/2009 | Krug et al. |
| 2009/0171767 A1 * | 7/2009 | Kolessar ............ G06Q 30/0203 705/7.32 |
| 2009/0193052 A1 * | 7/2009 | FitzGerald ............. G06Q 30/02 |
| 2010/0161506 A1 | 6/2010 | Bosenick et al. |
| 2010/0199296 A1 | 8/2010 | Lee et al. |
| 2010/0222087 A1 | 9/2010 | Dragt |
| 2010/0269127 A1 | 10/2010 | Krug |
| 2011/0025914 A1 | 2/2011 | McRae et al. |
| 2011/0028093 A1 | 2/2011 | Patel et al. |
| 2011/0099142 A1 | 4/2011 | Karjalainen et al. |
| 2011/0106587 A1 | 5/2011 | Lynch et al. |
| 2011/0153391 A1 | 6/2011 | Tenbrock |
| 2011/0295926 A1 * | 12/2011 | Battiston ................ H04H 60/58 709/202 |
| 2012/0063427 A1 | 3/2012 | Kandekar et al. |
| 2012/0173701 A1 | 7/2012 | Tenbrock |
| 2012/0245978 A1 | 9/2012 | Jain et al. |
| 2012/0278377 A1 | 11/2012 | Weissman et al. |
| 2012/0300944 A1 | 11/2012 | Spittle |
| 2013/0157563 A1 | 6/2013 | Jain et al. |
| 2013/0157568 A1 | 6/2013 | Jain et al. |
| 2014/0229232 A1 | 8/2014 | Crystal et al. |
| 2014/0295764 A1 | 10/2014 | Jain et al. |
| 2015/0100692 A1 | 4/2015 | Jain et al. |

FOREIGN PATENT DOCUMENTS

| | | |
|---|---|---|
| EP | 0231427 | 8/1987 |
| EP | 1133090 | 9/2001 |
| EP | 1213860 | 6/2002 |
| JP | 2001209881 | 8/2001 |
| JP | 2004222129 | 8/2004 |
| JP | 2005520393 | 7/2005 |
| JP | 2006260275 | 9/2006 |
| WO | 9504430 | 2/1995 |
| WO | 9810539 | 3/1998 |
| WO | 9933206 | 7/1999 |
| WO | 0211123 | 2/2002 |
| WO | 03077455 | 9/2003 |
| WO | 03091990 | 11/2003 |
| WO | 03095945 | 11/2003 |
| WO | 2005071961 | 8/2005 |
| WO | 2006037014 | 4/2006 |
| WO | 2011080707 | 7/2011 |
| WO | 2013090916 | 6/2013 |
| ZA | 20048525 | 3/2006 |

OTHER PUBLICATIONS

United States Patent and Trademark Office, Final Office action, issued in connection with U.S. Appl. No. 13/327,993, mailed on Feb. 25, 2014, 9 pages.

United States Patent and Trademark Office, Notice of Allowance, issued in connection with U.S. Appl. No. 13/327,993, mailed on Jul. 11, 2014, 11 pages.

(56) References Cited

OTHER PUBLICATIONS

United States Patent and Trademark Office, Notice of Allowance, issued in connection with U.S. Appl. No. 13/327,993, mailed on Oct. 24, 2014, 18 pages.
International Searching Authority, Search Report, issued in connection with PCT patent application No. PCT/US12/70163, mailed on Feb. 25, 2013, 4 pages.
International Searching Authority, Written Opinion, issued in connection with PCT patent application No. PCT/US12/70163, mailed on Feb. 25, 2013, 4 pages.
International Searching Authority, International Search Report, issued in connection with International Patent Application No. PCT/US12/70162, mailed Mar. 4, 2013 (2 pages).
International Searching Authority, International Preliminary Report on Patentability, issued in connection with International Patent Application No. PCT/US2012/070162, mailed Jun. 17, 2014 (5 pages).
International Searching Authority, Written Opinion, issued in connection with International Patent Application No. PCT/US12/70162, mailed Mar. 4, 2013 (4 pages).
State Intellectual Property Office of China, First Notification of Office Action, issued in connection with Chinese Patent Application No. 201280069886.4, mailed Apr. 22, 2015 (20 pages).
United States Patent and Trademark Office, Notice of Allowance, issued in connection with U.S. Appl. No. 13/327,943, mailed May 21, 2013 (9 pages).
United States Patent and Trademark Office, Final Office Action, issued in connection with U.S. Appl. No. 14/303,032, mailed Mar. 17, 2015 (7 pages).
United States Patent and Trademark Office, Non-Final Office Action, issued in connection with U.S. Appl. No. 14/303,032, mailed Aug. 14, 2014 (6 pages).
European Patent Office, Extended Search Report, issued in connection with European Patent Application No. 12857984.4, mailed Jul. 3, 2015 (6 pages).
Intellectual Property Corporation of Malaysia, Substantive Examination Adverse Report and Search Report, issued in connection with Malaysian Application No. PI20080006, on Dec. 31, 2008 (3 pages).
Intellectual Property Corporation of Malaysia, Substantive Examination Adverse Report and Search Report, issued in connection with Malaysian Application No. PI20031501, on Aug. 14, 2009 (3 pages).
European Patent Office, Supplementary European Search Report, issued in connection with application No. 03750041.0, on Oct. 19, 2010 (3 pages).
European Patent Office, Communication and Examination, issued in connection with application No. 03750041.0, on Apr. 11, 2011 (7 pages).
State Intellectual Property Office of China, Third Office Action with English Translation, issued in connection with application No. 200710139849.7, on Aug. 3, 2012 (6 pages).
State Intellectual Property Office of China, Translation of the Second Office Action, issued in connection with application No. 200710139849.7, on Nov. 30, 2011 (1 page).
State Intellectual Property Office of China, Redacted Translated Text of the First Office Action, issued in connection with application No. 200710139849.7, on Mar. 13, 2009 (2 pages).
State Intellectual Property Office of China, Text of the First Office Action, issued in connection with application No. 03809075.9, on Sep. 7, 2007 (3 pages).
Mexican Patent Office, Official Action with English Translation, issued in connection with application No. MX/a/2007/012204, on Jun. 8, 2010 (6 pages).
Patent Reexamination Board of the State Intellectual Property Office of China, Text of the Notification of Reexamination, issued in connection with application No. 03809075.9, on Jul. 19, 2011 (7 pages).
State Intellectual Property Office of China, Rejection Decision, issued in connection with application No. 03809075.9, on Jan. 15, 2010 (11 pages).

Korean Intellectual Property Office, Translation of Notice of Preliminary Rejection, issued in connection with application No. 10-2004-7017055, on Nov. 30, 2009 (6 pages).
Government of India Patent Office, First Examination Report, issued in connection with application No. 2346/CHENP/2004, on Aug. 9, 2010 (2 pages).
Canadian Intellectual Property Office, First Office Action, issued in connection with application No. 2,483,042, on Jun. 15, 2010 (8 pages).
Canadian Intellectual Property Office, Second Office Action, issued in connection with application No. 2,483,042, on Oct. 11, 2011 (5 pages).
International Preliminary Examining Authority, International Preliminary Examination Report, issued in connection with application No. PCT/US03/12371, on Feb. 22, 2005 (29 pages).
Intellectual Property Office of New Zealand, Examination Report, issued in connection with application No. 556380, on Jul. 13, 2007 (1 page).
Mexican Patent Office, Redacted English Summary of Office Action, issued in connection with application No. PA/a/2004/010349, on Jun. 6, 2007 (3 pages).
United States Patent and Trademark Office, Issue Notification, issued in connection with U.S. Appl. No. 10/970,585, on Jun. 27, 2012 (1 page).
Canadian Intellectual Property Office, Office Action, issued in connection with Canadian Application No. 2,483,042, on May 14, 2013, (5 pages).
European Patent Office, European Search Report, issued in connection with European Application No. 13002091.0 on Dec. 11, 2013 (9 pages).
United States Patent and Trademark Office, Notice of Allowance, issued in connection with U.S. Appl. No. 13/526,415, dated Jun. 10, 2013 (16 pages).
Canadian Intellectual Property Office, Office Action, issued in connection with Canadian Patent Application No. 2,483,042, dated Jun. 9, 2014 (2 pages).
United States Patent and Trademark Office, Restriction Requirement, issued in connection with U.S. Appl. No. 10/970,585, on Apr. 16, 2008 (6 pages).
United States Patent and Trademark Office, Restriction Requirement, issued in connection with U.S. Appl. No. 10/970,585, on Aug. 21, 2008 (9 pages).
United States Patent and Trademark Office, Office Action, issued in connection with U.S. Appl. No. 10/970,585, on Oct. 29, 2008 (52 pages).
United States Patent and Trademark Office, Office Action, issued in connection with U.S. Appl. No. 10/970,585, on Jun. 4, 2009 (47 pages).
United States Patent and Trademark Office, Office Action, issued in connection with U.S. Appl. No. 10/970,585, on Oct. 27, 2009 (24 pages).
United States Patent and Trademark Office, Office Action, issued in connection with U.S. Appl. No. 10/970,585, on May 10, 2010 (18 pages).
United States Patent and Trademark Office, Office Action, issued in connection with U.S. Appl. No. 10/970,585, on Dec. 29, 2010 (26 pages).
United States Patent and Trademark Office, Office Action, issued in connection with U.S. Appl. No. 10/970,585, on Aug. 18, 2011 (16 pages).
United States Patent and Trademark Office, Notice of Allowance, issued in connection with U.S. Appl. No. 10/970,585, on Mar. 16, 2012 (14 pages).
Australian Patent Office, Patent Examination Report 3, issued in connection with application No. AU 2007316392, on Mar. 4, 2013 (4 pages).
European Patent Office, Examination Report, issued in connection with application No. EP 07844943.6, on Aug. 12, 2013 (7 pages).
European Patent Office, Extended European Search Report, issued in connection with application No. EP 07844943.6, on Dec. 30, 2010 (10 pages).
Walker, R., "Audio Watermarking," R&D White Paper WHP 057, BBC Research and Development, Aug. 31, 2004, 18 pages—cited in

(56) References Cited

OTHER PUBLICATIONS

Extended European Search Report, issued in connection with application No. EP 07844943.6, on Dec. 30, 2010 (18 pages).
European Patent Office, Examination Report, issued in connection with application No. EP 07844943.6, on Dec. 8, 2011 (5 pages).
State Intellectual Property Office of China, First Office Action, issued in connection with application No. CN 200780047653.3, on Aug. 27, 2010 (8 pages).
State Intellectual Property Office of China, Second Office Action, issued in connection with application No. CN 200780047653.3, on Jul. 20, 2011 (9 pages).
Israel Patent Office, Office Action with English summary, issued in connection with application No. IL198525, on Nov. 22, 2012 (4 pages).
Japanese Patent Office, Office Action, issued in connection with application No. JP 2009-536460, mailed on Jun. 12, 2012 (5 pages).
Japanese Patent Office, Office Action, issued in connection with application No. JP 2009-536460, mailed on Jun. 18, 2013 (10 pages).
Korean Intellectual Property Office, Office Action, issued in connection with application no. KR 10-2009-7011445, on Dec. 12, 2013 (10 pages).
Mexico Patent Office, Summary of Office Action, in connection with application No. MX/a/2009/004889, mailed on Jul. 1, 2013 (2 pages).
International Bureau, International Preliminary Report on Patentability, issued in connection with application No. PCT/US2007/083940, on May 12, 2009 (4 pages).
International Searching Authority, Written Opinion of the International Searching Authority, issued in connection with application No. PCT/US2007/083940, on Apr. 16, 2008 (3 pages).
International Searching Authority, International Search Report, issued in connection with application No. PCT/US2007/083940, on Apr. 16, 2008 (1 page).
Australian Patent Office, Patent Examination Report 1, issued in connection with application No. AU 2007316392, on Sep. 10, 2012 (3 pages).
Australian Patent Office, Patent Examination Report 2, issued in connection with application No. AU 2007316392, on Jan. 2, 2013 (3 pages).
Japanese Patent Office, Final Rejection, issued in connection with JP Application No. P2009-536460, on Jan. 28, 2014 (5 pages).
United States Patent and Trademark Office, Office Action, issued in connection with U.S. Appl. No. 11/935,788, on Sep. 17, 2009 (19 pages).
United States Patent and Trademark Office, Office Action, issued in connection with U.S. Appl. No. 11/935,788, on May 24, 2010 (20 pages).
United States Patent and Trademark Office, Office Action, issued in connection with U.S. Appl. No. 11/935,788, on Nov. 3, 2010 (29 pages).
United States Patent and Trademark Office, Office Action, issued in connection with U.S. Appl. No. 11/935,788, on May 11, 2011 (28 pages).
United States Patent and Trademark Office, Office Action, issued in connection with U.S. Appl. No. 11/935,788, on Sep. 16, 2011 (31 pages).
United States Patent and Trademark Office, Office Action, issued in connection with U.S. Appl. No. 11/935,788, on May 9, 2012 (29 pages).
United States Patent and Trademark Office, Office Action, issued in connection with U.S. Appl. No. 11/935,788, on Mar. 4, 2013 (30 pages).
United States Patent and Trademark Office, Notice of Allowance, issued in connection with U.S. Appl. No. 11/935,788, on Oct. 4, 2013 (22 pages).
United States Patent and Trademark Office, Notice of Allowance, issued in connection with U.S. Appl. No. 11/935,788, on Jan. 15, 2014 (29 pages).
Complaint in *Arbitron Inc.*, v. *John Barrett Kiefl* in United States District Court for the Southern District of New York, Apr. 22, 2009, Case 1:09-cv-04013-PAC, (12 pages).
Macera, John S. (representing Kiefl) to Michael Skarzynski (of Arbitron), re: Alleged Patent Infringement, Exhibit 1 of the Apr. 22, 2009 Complaint in *Arbitron Inc.*, v. *John Barrett Kiefl* in United States District Court for the Southern District of New York, Case 1:09-cv-04013-PAC, Apr. 8, 2009, (8 pages).
Skarzynski, Michael (of Arbitron), to John S. Macera (representing Kiefl), re: Alleged Patent Infringement, Apr. 23, 2009, (2 pages).
Australian Government, IP Australia, Notice of Acceptance, issued in connection with application No. AU 2007316392, on May 15, 2014 (2 pages).
Korean Intellectual Property Office, Office Action, issued in connection with application No. KR 10-2009-7011445, on Jun. 10, 2014 (9 pages).
Canadian Intellectual Property Office, Office Action, issued in connection with application No. CA 2,669,133, on Jun. 16, 2014 (2 pages).
Israel Patent Office, Office Action with redacted translation, issued in connection with application No. IL 198525, on Jun. 18, 2014 (4 pages).
Canadian Intellectual Property Office, Office Action, issued in connection with Canadian Patent Application No. 2,647,982, dated Nov. 13, 2014 (4 pages).
European Patent Office, Examination Report, issued in connection with European Patent Application No. 03750041.0, dated Jan. 14, 2015 (5 pages).
United States Patent and Trademark Office, Notice of Allowance, issued in connection with U.S. Appl. No. 14/733,651, mailed on Jul. 6, 2015 (45 pages).
Want, Roy et al., "Bridging Physical and Virtual Worlds with Electronic Tags", dated Apr. 1999 (8 pages).
Timo, "iPhone RFID: Object Based Media", dated Apr. 14, 2009, [http://www.nearfield.org/2009/04/iphone-rfid-nfc], retrieved on Jul. 27, 2015 (12 pages).
European Patent Office, European Search Report, in connection with European U.S. Pat. No. 12858408.3, Jul. 7, 2015 (8 pages).
Bluetooth, "Simple Pairing Whitepaper," http:archive.org/web/20061018032605, Aug. 3, 2006 (24 pages).
United States Patent and Trademark Office, Advisory Action, issued in connection with U.S. Appl. No. 11/935,788, mailed Aug. 30, 2012 (3 pages).

* cited by examiner

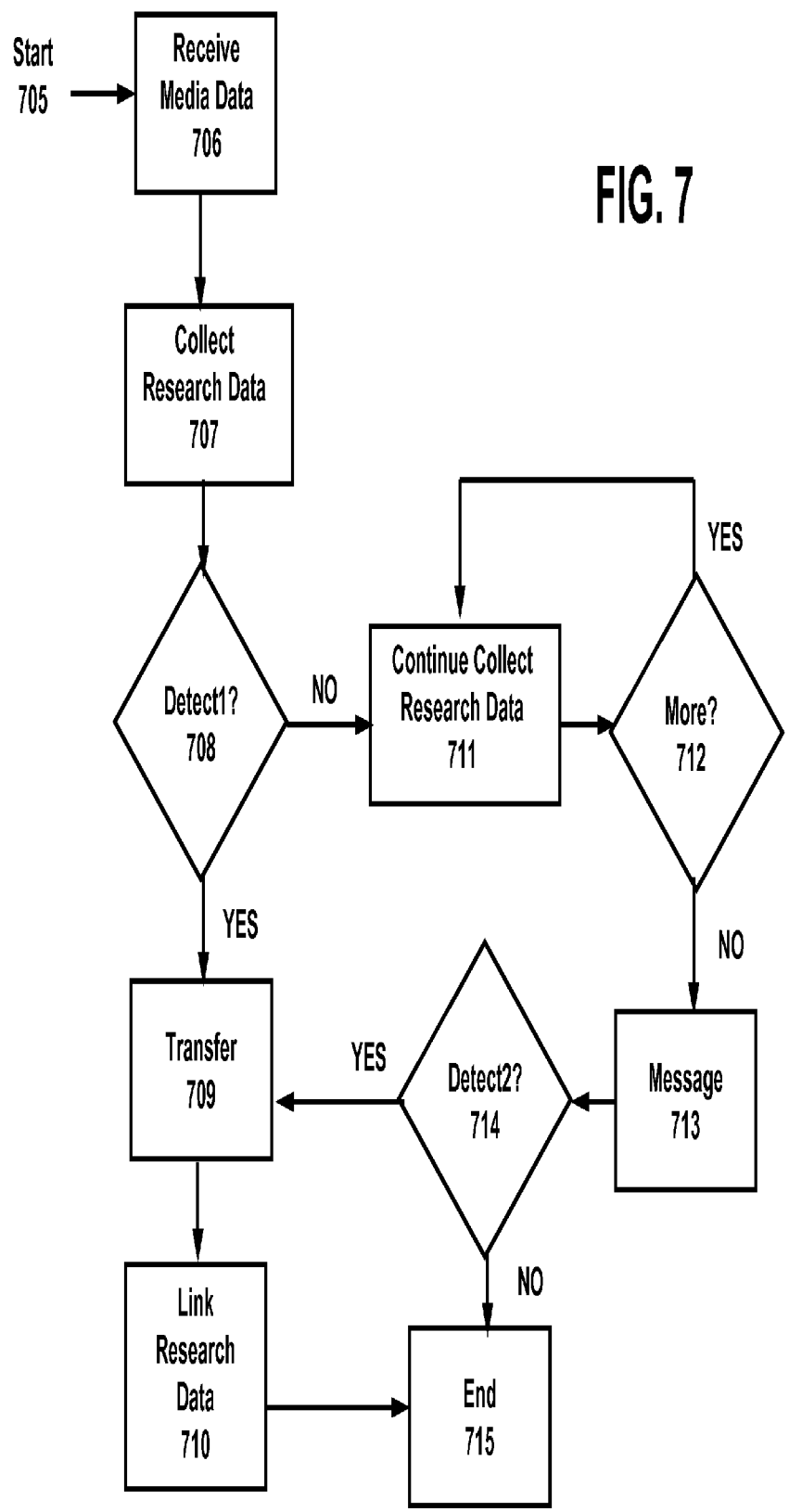

MEDIA EXPOSURE AND VERIFICATION UTILIZING INDUCTIVE COUPLING

PRIORITY

This patent arises from a continuation application of U.S. patent application Ser. No. 13/327,993, filed on Dec. 16, 2011, which is hereby incorporated herein by reference in its entirety.

TECHNICAL FIELD

The present disclosure is directed to processor-based audience analytics. More specifically, the disclosure describes systems and methods for utilizing inductive coupling to perform audience measurement where inductive coupling is utilized to measure and verify user exposure to media data.

BACKGROUND INFORMATION

Interest in measuring media data exposure has been growing in recent years, with many seeking to determine the numbers and types of individuals that are exposed to or consume media data. The terms "media data" and "media" as used herein mean data which is widely accessible, whether over-the-air, or via cable, satellite, network, internetwork (including the Internet), displayed, distributed on storage media, or by any other means or technique that is humanly perceptible, without regard to the form or content of such data, and including but not limited to audio, video, audio/video, text, images, animations, databases, broadcasts, displays (including but not limited to video displays), web pages and streaming media. To date, a number of improvements have been made for counting aggregate numbers of users that may have been exposed to media data.

However, one area where improvements are needed is the accuracy of media exposure tracking. While aggregate numbers are useful in determining total user exposure to media data, these aggregate numbers do not have sufficient information linking individual users to media data and occasionally have inconsistencies and/or inaccuracies. Recent advances in inductive coupling technologies make this platform attractive for use in identifying users. What is needed are methods, systems and apparatuses for utilizing inductive couple in conjunction with media exposure data to produce research data that accurately identifies and characterizes devices, and their accompanying users. The term "research data" as used herein means data comprising (1) data concerning usage of media data, (2) data concerning exposure to media data, and/or (3) market research data.

SUMMARY

Accordingly, apparatuses, systems and methods are disclosed for computer-implemented techniques for establishing media data exposure for a computer processing device or other device capable of receiving media data where media data is received in is verified with a plurality of portable computing devices utilizing inductive coupling. In one embodiment, a computer-implemented method for processing media data exposure is disclosed for receiving media data in a computer processing device; producing research data relating to the media data; detecting if a portable computing device is inductively coupled to the computer processing device; receiving information from the portable computing device via an inductive connection if it is detected that a portable computing device is coupled; and associating the information to the research data.

Under another embodiment, a processor-implemented method for processing media data exposure is disclosed for receiving media data in a portable device configured to communicate via an inductive connection; generating research data, based on the media data, in the portable device; and receiving further data via the inductive connection from a media device that reproduced the media data, wherein the further data is associated with the research data. Under yet another embodiment, a processor-implemented method for processing media data exposure is disclosed receiving a plurality of research data relating to a plurality of media data presented on a plurality of devices; receiving portable computing device data relating to information received by each of a plurality of devices via an inductive connection with a respective plurality of portable computing devices; associating the portable computing device data with the plurality of research data; and generating a media exposure report based on the association.

BRIEF DESCRIPTION OF THE DRAWINGS

The present invention is illustrated by way of example and not limitation in the figures of the accompanying drawings, in which like references indicate similar elements and in which:

FIG. 7 is an exemplary flowchart for associating users to media data to provide research data having linked inductive coupling characteristics.

DETAILED DESCRIPTION

Figure 1:
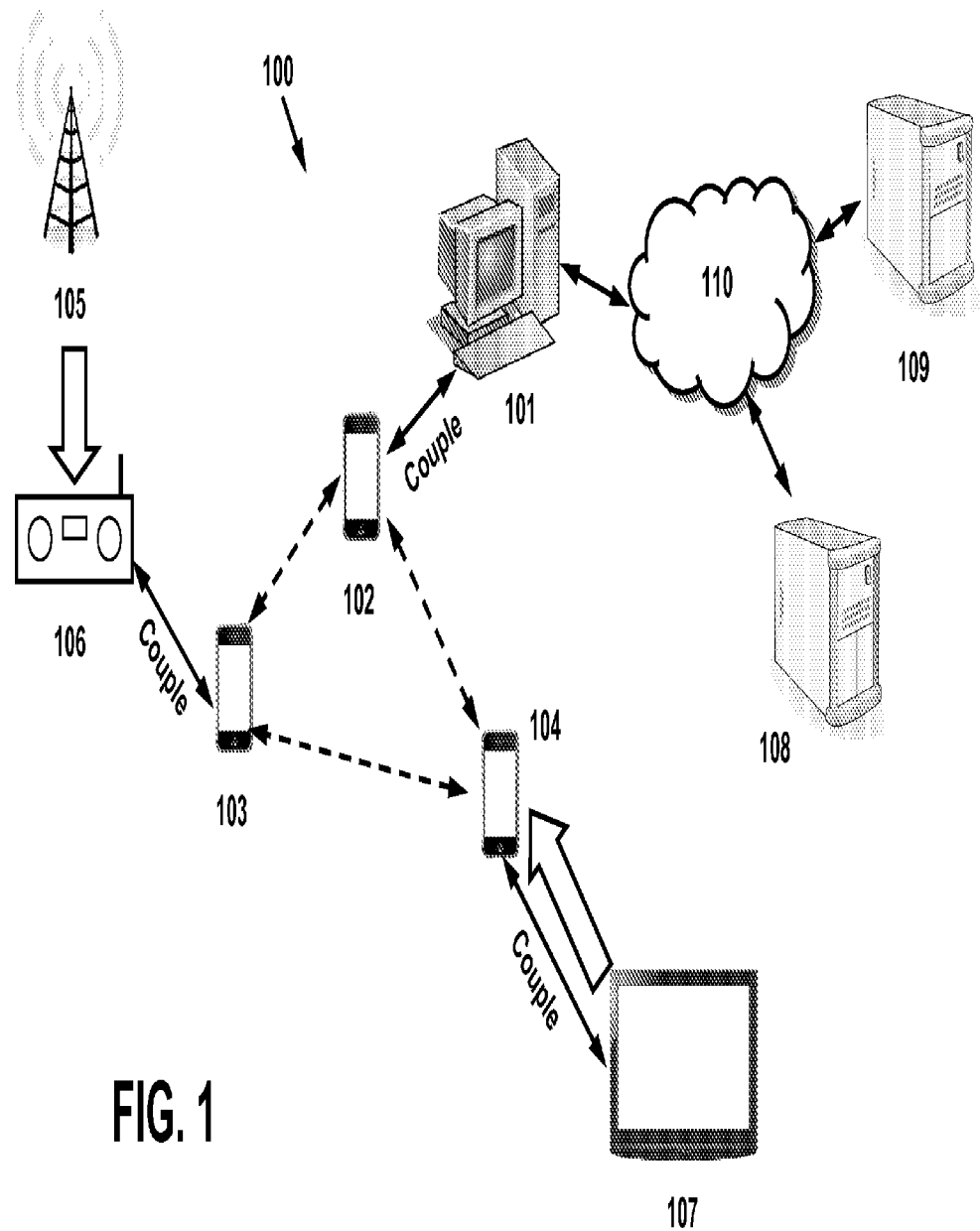
FIG. 1 illustrates an exemplary system under one embodiment, where media data is provided from a network to a processing device in the vicinity of a plurality of portable devices.

FIG. 1 illustrates an exemplary system 100 that comprises a computer processing device 101 and a plurality of portable computing devices (102-104) that are in the vicinity of processing device 101. In this example, processing device 101 is illustrated as a personal computer, while portable computing devices 102-104 are illustrated as cell phones. It is understood by those skilled in the art that other similar devices may be used as well. For example, processing device 101 may also be a laptop, a computer tablet, a set-top box, a media player, a network-enabled television or DVD player, and the like. Portable computing devices 102-104 may also be laptops, PDAs, tablet computers, Personal People Meters™ (PPMs), wireless telephone, etc.

Under a preferred embodiment, computer processing device 101 connects to content source 109 via network 110 to obtain media data. The terms "media data" and "media" as used herein mean data which is widely accessible, whether over-the-air, or via cable, satellite, network, internetwork (including the Internet), displayed, distributed on storage media, or by any other means or technique that is humanly perceptible, without regard to the form or content of such data, and including but not limited to audio, video, audio/video, text, images, animations, databases, broadcasts, displays (including but not limited to video displays), web pages, computer files and streaming media. As media is received on computer processing device 101, analytics software residing on computer processing device 101 (possibly communicating with collection server 108) collects information relating to media data received from content source 109, and additionally may collect data relating to network 110.

Data relating to the media data may include a "cookie", also known as an HTTP cookie, which can provide state information (memory of previous events) from a user's browser and return the state information to a collecting site, which may be the content source 109 or collection server 108, or both. The state information can be used for identification of a user session, authentication, user's preferences, shopping cart contents, or anything else that can be accomplished through storing text data on the user's computer. When setting a cookie, transfer of content such as Web pages follows the HyperText Transfer Protocol (HTTP). Regardless of cookies, browsers request a page from web servers by sending a HTTP request. The server replies by sending the requested page preceded by a similar packet of text, called "HTTP response". This packet may contain lines requesting the browser to store cookies. The server sends lines of Set-Cookie only if the server wishes the browser to store cookies. Set-Cookie is a directive for the browser to store the cookie and send it back in future requests to the server (subject to expiration time or other cookie attributes), if the browser supports cookies and cookies are enabled. The value of a cookie can be modified by sending a new Set-Cookie: name=newvalue line in response of a page request. The browser then replaces the old value with the new one. Cookies can also be set by JavaScript or similar scripts running within the browser. In JavaScript, the object document.cookie is used for this purpose.

Various cookie attributes can be used: a cookie domain, a path, expiration time or maximum age, "secure" flag and "HTTPOnly" flag. Cookie attributes may be used by browsers to determine when to delete a cookie, block a cookie or whether to send a cookie (name-value pair) to the collection site 121 or content site 125. With regard to specific "cookies", a session cookie may be used, which typically only lasts for the duration of users using the website. A web browser normally deletes session cookies when it quits. A session cookie is created when no expires directive is provided when the cookie is created. In another embodiment, a persistent cookie (or "tracking cookie", "in-memory cookie") may be used, which may outlast user sessions. If a persistent cookie has its Max-Age set to 1 year, then, within the year, the initial value set in that cookie would be sent back to a server every time a user visited that server. This could be used to record information such as how the user initially came to the website. Also, a secure cookie may be used when a browser is visiting a server via HTTPS, ensuring that the cookie is always encrypted when transmitting from client to server. An HTTPOnly may also be used. On a supported browser, an HTTPOnly session cookie may be used for communicating HTTP (or HTTPS) requests, thus restricting access from other, non-HTTP APIs (such as JavaScript). This feature may be advantageously applied to session-management cookies.

Under another embodiment, one or more remote servers may be responsible for collecting research data on media data exposure, particularly for Internet-related media data. This embodiment is particularly advantageous when remote media data exposure techniques are used to produce research data. One technique, referred to as "logfile analysis," reads the logfiles in which a web server records all its transactions. A second technique, referred to as "page tagging," uses JavaScript on each page to notify a third-party server when a page is rendered by a web browser. Both collect data that can be processed to produce web traffic reports together with the Bluetooth signal characteristics. In certain cases, collecting web site data using a third-party data collection server (or even an in-house data collection server) requires an additional DNS look-up by the user's computer to determine the IP address of the collection server. As an alternative to logfile analysis and page tagging, "call backs" to the server from the rendered page may be used to produce research data. In this case, when the page is rendered on the web browser, a portion of Ajax code calls to the server (XMLHttpRequest) and passes information about the client that can then be aggregated.

Referring back to the example of FIG. 1, media data is received on processing device 101. Portable computing device 103, however, is receiving media data in the form of a radio broadcast 105 audibly reproduced on radio 106. In this embodiment, device 103 is equipped with specially designed software that allows it to produce research data relating to the broadcast. The term "research data" as used herein means data comprising (1) data concerning usage of media data, (2) data concerning exposure to media data, and/or (3) market research data. Under one embodiment, research data comprises ancillary codes detected from the audio signal in broadcast 105. The ancillary codes may be encoded and detected using any of the techniques found in U.S. Pat. No. 5,450,490 and U.S. Pat. No. 5,764,763 (Jensen et al.) in which information is represented by a multiple-frequency code signal which is incorporated into an audio signal based upon the masking ability of the audio signal. Additional examples include U.S. Pat. No. 6,871,180 (Neuhauser et al.) and U.S. Pat. No. 6,845,360 (Jensen et al.), where numerous messages represented by multiple frequency code signals are incorporated to produce and encoded audio signal. Each of the above-mentioned patents is incorporated by reference in its entirety herein. When the ancillary codes are detected in device 103, they may be transmitted to collection server 108 for further processing and identification for the purposes of producing research data.

In another embodiment, the research data comprises audio signatures (also known as audio "fingerprints") that are generated in portable user device 103. The audio signatures are comprised of features extracted from the audio itself using a time-frequency analysis, mainly performed through Fourier transforms or alternately wavelet transforms. In the latter case, a combination of Fast-Fourier Transformation (FFT) and Discrete Cosine Transformation (DCT) may be used. Examples of suitable audio fingerprint configurations are disclosed in U.S. Pat. No. 5,436,653 (Ellis, et al.), WO Patent Publication No. 02/11123, titled "System and Methods for Recognizing Sound and Music Signals In High Noise and Distortion" and WO Patent Publication No. 03/091990, titled "Robust and Invariant Audio Pattern Matching." Each of these documents is incorporated by reference in its entirety herein. When audio signatures are formed in portable computing device 103, they may be transmitted to collection server 108 for further processing and matching to identify the broadcast for the purposes of producing research data.

Portable computing device 104 receives media data from television 107. Under one embodiment, television 107 receives media data in the form of broadcast television via terrestrial means, satellite, cable, etc. Portable computing device 104 produces research data based on the audio component of the television broadcast, using ancillary codes and/ or audio signatures, similar to portable computing device 103. Under another embodiment, television 107 is a "smart" television, meaning that the device is either a television set with integrated internet capabilities or a set-top box for television that offers more advanced computing ability and connectivity than a contemporary basic television set. Smart televisions may be thought of as an information appliance or a computer system integrated within a television set unit. As such, a smart television may allow the user to install and run more advanced applications or plugins/addons based on a specific platform. In this example, media data exposure occurs similar to computer processing device 101, described above.

Each of the portable processing devices 102-104 are equipped with inductive transponders and/or interrogators (or "readers"). Likewise, computer processing device 101, radio 106 and television 107 are similarly equipped with inductive transponders and/or readers. When portable processing devices come in close proximity to a respective device (101, 106, 107), the devices inductively couple (102→101, 103→106, 104→107) and are capable of communicating data with each other. Under one embodiment, portable computing devices 102-104 are also capable of coupling and communicating with each other. The transponders may be passive transponders, meaning that they do not have their own power supply and therefore all power required for the operation must be drawn from the (electrical/magnetic) field of the reader, or may be active transponders, meaning that they incorporate a battery, which supplies all or part of the power for operation. The devices may be configured to operate using different transmission frequencies, which communicate in low frequency (LF; 30-300 kHz), high frequency (HF)/radio frequency (RF) (3-30 MHz) and ultra-high frequency (UHF; 300 MHz-3 GHz)/microwave (>3 GHz). They may be further configured to communicate in remote-coupling ranges (0-1 m), and/or long-ranges (>1 m).

In constructing the transponders for the devices of FIG. 1, a separate transponder coil may be fabricated to function as an antenna together with a transponder chip, where the chip contains an RF interface, antenna tuning capacitor, RF-to-DC rectifier system, digital control and EEPROM memory, and data modulation circuits. The transponder coil may be bonded to the transponder chip in the conventional manner Alternately, the coil may be integrated onto the chip ("coil-on-chip"). This may be done using a special microgalvanic process that can take place on a normal CMOS wafer. The coil is placed directly onto the isolator of the silicon chip in the form of a planar (single layer) spiral arrangement and contacted to the circuit by means of conventional openings in the passivation layer. The conductor track widths achieved may be in the range of 5-10 μm with a layer thickness of 15-30 μm. A final passivation onto a polyamide base is performed to guarantee the mechanical loading capacity of the contactless memory module based upon coil-on-chip technology.

Figure 2:
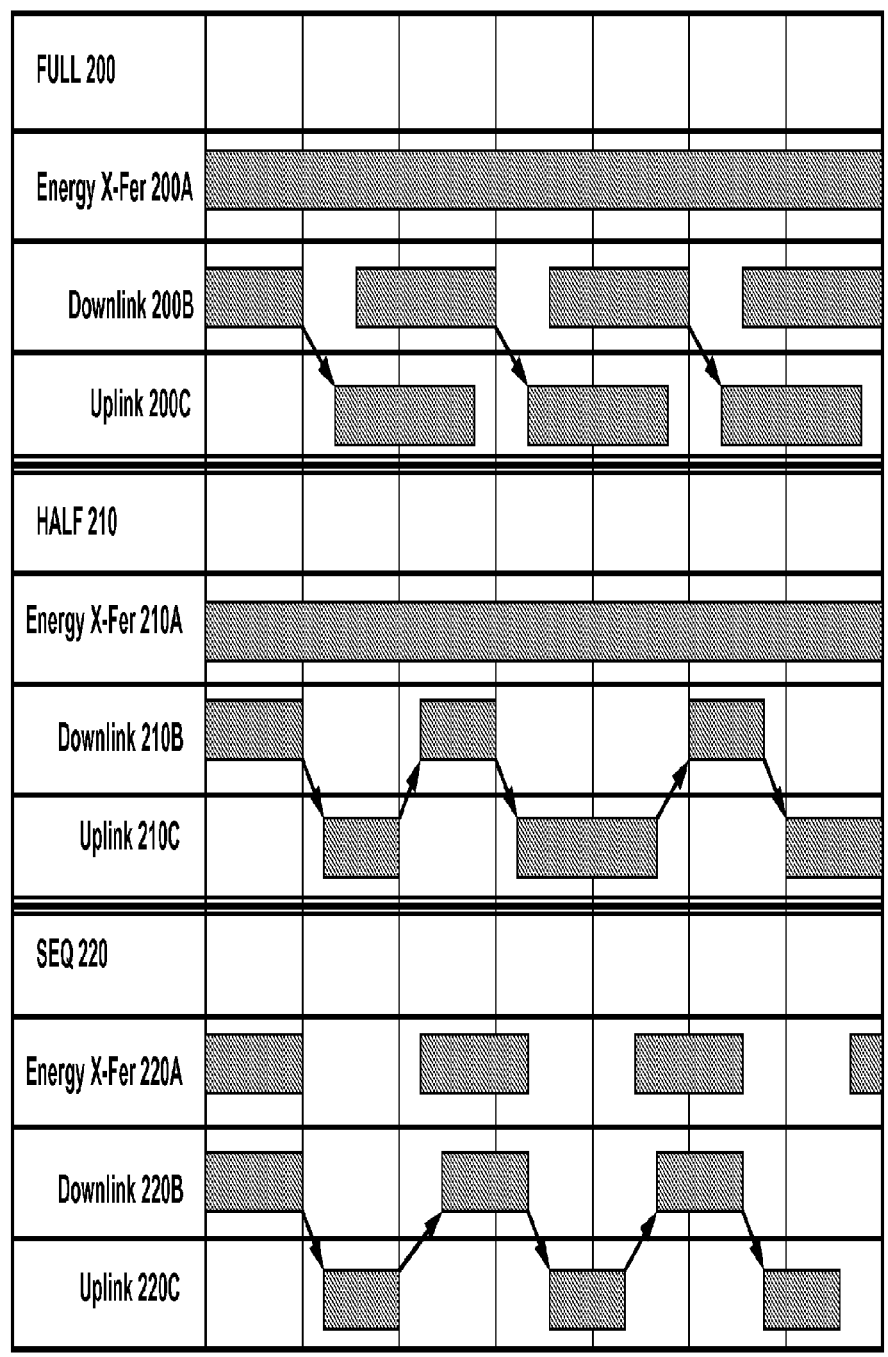
FIG. 2 illustrates a graphic representation of inductive coupling data transfers under a plurality of different configurations.

The transponders/readers used for FIG. 1 may be configured to transmit data using full-duplex, half-duplex and/or sequential communications. The transponders used in FIG. 1 preferably use an electronic microchip as the data-carrying device. This has a data storage capacity of between a few bytes and more than 100 kilobytes. To read from or write to the data-carrying device it must be possible to transfer data between the reader and the transponder and then back from the transponder to the reader. This transfer takes place according to a plurality of configurations: full-duplex, half-duplex and sequential. In FIG. 2, an illustration is provided representing full-duplex (FULL), half-duplex (HALF) and sequential (SEQ) communication over time. Data transfer from the reader to the transponder is termed down-link, while data transfer from the transponder to the reader is termed up-link.

In the full-duplex procedure (200) the data transfer 200A from the transponder to the reader (up-link 200C) takes place at the same time as the data transfer from the reader to the transponder (down-link 200B). This includes configurations in which data is transmitted from the transponder at a fraction of the frequency of the reader, i.e. a subharmonic, or at a completely independent, i.e. an anharmonic, frequency. In half-duplex communication (210) the data transfer from the transponder to the reader alternates with data transfer from the reader to the transponder (210B, 210C). At frequencies below 30 MHz this is most often used with a load modulation procedure, either with or without a subcarrier. For both full-duplex and half-duplex communication, the transfer of energy from the reader to the transponder is continuous, i.e. it is independent of the direction of data flow. In sequential communication (SEQ 220), on the other hand, the transfer of energy from the transponder to the reader takes place for a limited period of time only. Data transfer from the transponder to the reader (220C) occurs in the pauses between the power supply to the transponder (220B). The data transfer may be accomplished utilizing amplitude shift keying (ASK), frequency shift keying (FSK) and/or phase shift keying (PSK). Under a preferred embodiment, ASK is used due to the simplicity of demodulation.

As is known in the art, inductive coupling is based upon a transformer-type coupling between the primary coil in the reader and the secondary coil in the transponder. This is true when the distance between the coils does not exceed ($\lambda/2\pi$) $0.16\lambda$, so that the transponder is located in the near field of the transmitter antenna. If a resonant transponder (i.e. a transponder with a self-resonant frequency corresponding with the transmission frequency of the reader) is placed within the magnetic alternating field of the reader's antenna, the transponder draws energy from the magnetic field. The resulting feedback of the transponder on the reader's antenna can be represented as transformed impedance in the antenna coil of the reader. Switching a load resistor on and off at the transponder's antenna therefore brings about a change in the impedance, and thus voltage changes at the reader's antenna. This has the effect of an amplitude modulation of the voltage at the reader's antenna coil by the remote transponder. If the timing with which the load resistor is switched on and off is controlled by data, this data can be transferred from the transponder to the reader. This type of data transfer is referred to load modulation.

Figure 3:
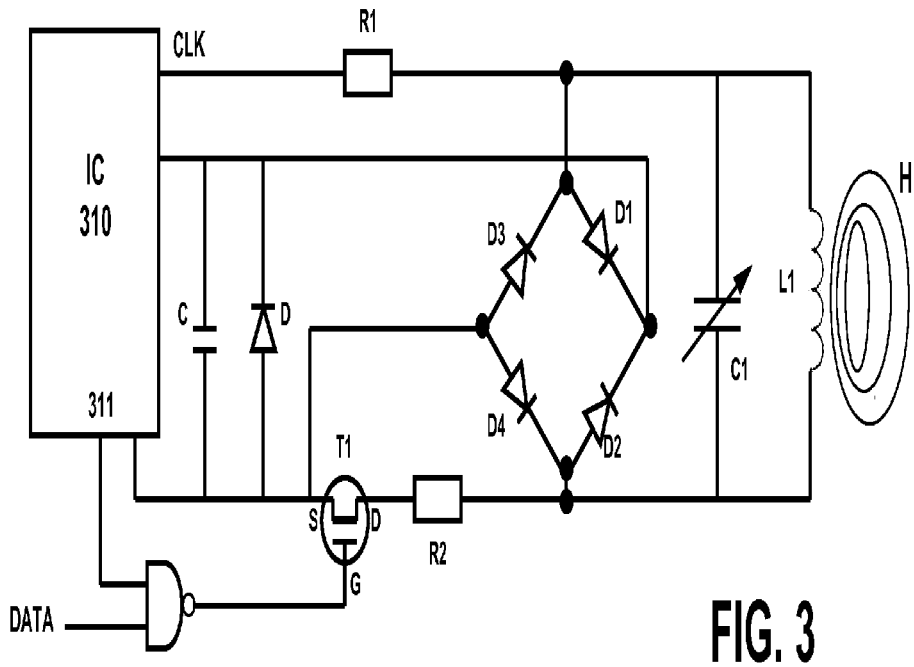
FIG. 3 illustrates an exemplary load modulation circuit for an inductively coupled transponder.

FIG. 3 illustrates an exemplary circuit for a transponder using load modulation with a subcarrier. The circuit is advantageous for an operating frequency of 13.56 MHz and is capable of generating a subcarrier of 212 kHz. The voltage induced at antenna coil L1 by the magnetic alternating field (H) of a reader is rectified using the bridge rectifier (D1-D4) and after additional smoothing (C1) is available to the circuit as supply voltage. The parallel regulator prevents the supply voltage from being subject to an uncontrolled increase when the transponder approaches a reader antenna. To reclaim the data at the reader, voltage tapped at the reader's antenna is rectified. This represents the demodulation of an amplitude modulated signal. Part of the high frequency antenna voltage (13.56 MHz) travels to the frequency divider's timing input (CLK) via the protective resistor (R1) and provides the transponder with the basis for the generation of an internal clocking signal. After division, a subcarrier clocking signal of 212 kHz is available at output 311 of IC 310. The subcarrier clocking signal, controlled by a serial data flow at the data input (DATA), is passed to the switch T1. If there is a logical "high" signal at the data input (DATA), then the subcarrier clocking signal is passed to switch T1. Load resistor R2 is then switched on and off in time with the subcarrier frequency. Optionally in the circuit depicted, the transponder resonant circuit can be brought into resonance with the capacitor C1 at 13.56 MHz. The range of the transponder can be significantly increased in this manner.

Figure 4:
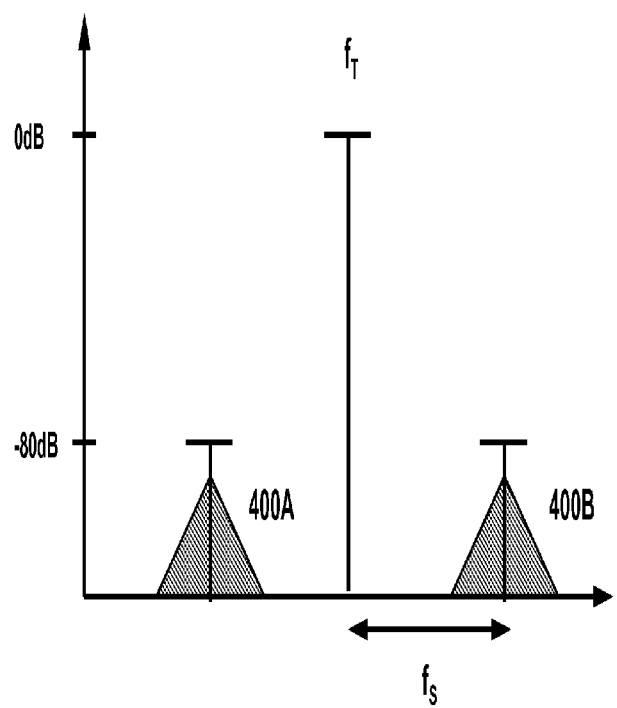
FIG. 4 illustrates an exemplary graphic representation of subcarriers for data transmitted on a inductively coupled carrier signal.

FIG. 4 illustrates load modulation where two sidebands (400A, 400B) are represented by modulation products utilizing load modulations with a subcarrier. These modulation sidebands can be separated from the significantly stronger signal of the reader by bandpass filtering. After amplification, the subcarrier signal can be advantageously demodulated. As can be seen from FIG. 4, sidebands 400A, 400B are created at a distance of the subcarrier frequency $f_S$ around the transmission frequency of the reader, where $f_T$ represents a carrier signal of the reader, measured at the antenna coil. Information is carried in the sidebands of the two subcarrier sidebands, which are created by the modulation of the subcarrier. Load modulation with subcarriers is preferably performed in the frequency range 13.56 MHz, using subcarrier frequencies of 212 kHz, 424 kHz (see ISO/IEC 15 693) and 848 kHz (see ISO/IEC 14443).

Figure 5:
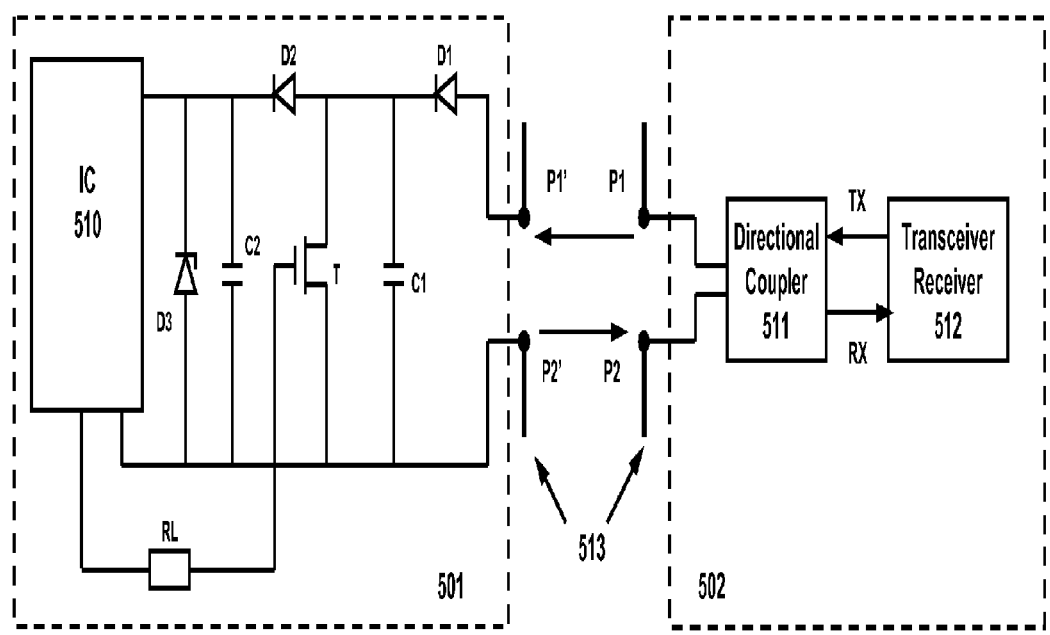
FIG. 5 illustrates an exemplary backscatter transponder under another exemplary embodiment.

FIG. 5 illustrates a circuit under another embodiment utilizing a long-range transponder, which allows inductively coupled communication to extend to distances exceeding one meter. The circuit may be operated at the UHF frequencies (e.g., 868 MHz, 915 MHz) and at microwave frequencies 2.5 and 5.8 GHz. The short wavelengths of these frequency ranges facilitate the construction of antennas with far smaller dimensions and greater efficiency than would be possible using frequency ranges below 30 MHz. Utilizing dipole antennas (513) Power P1 is emitted from the reader's (502) antenna, a proportion of which reaches the transponder's (501) antenna. The power P1' is supplied to the antenna connections as RF voltage and after rectification by the diodes D1 and D2 can be used as turn-on voltage for the deactivation or activation of the power saving 'power down' mode. Preferably, the diodes used are low-barrier Schottky diodes, which have a particularly low threshold voltage. The voltage obtained may also be sufficient to serve as a power supply for short ranges. If the transponder moves out of range of a reader, then the chip automatically switches over to the power-saving 'power down' mode. In this state the power consumption is a few µA at most. The chip is not reactivated until a sufficiently strong signal is received in the read range of a reader, whereupon it switches back to normal operation. The battery of an active transponder does not normally provide power for the transmission of data between transponder and reader, but supplies power to the microchip. Data transmission between transponder (501) and reader (502) relies upon the power of the electromagnetic field emitted by the reader under normal operation.

A proportion of the incoming power P1 is reflected by the antenna (513) and returned as power P2. The reflection characteristics of the antenna can be influenced by altering the load connected to the antenna. In order to transmit data from the transponder to the reader, a load resistor RL connected in parallel with the antenna is switched on and off in time (T) with the data stream to be transmitted. The amplitude of the power P2 reflected from transponder 501 can thus be modulated (backscatter). Power P2 reflected from the transponder is radiated into free space, where a proportion of it is picked up by the reader's antenna (513). The reflected signal travels into the antenna connection of the reader in the backwards direction and can be decoupled using a directional coupler 511 and transferred to the receiver (RX) input of reader 502. The forward signal of the transmitter TX, which is normally multiple times stronger by (e.g., 10×), is to a large degree suppressed by directional coupler 511.

Under another embodiment, inductive coupling may take place using near-field communication (NFC) which is a wireless data interface similar to infrared or Bluetooth. Data transmission between two NFC interfaces uses high-frequency magnetic alternating fields preferably in the frequency range of 13.56 MHz. A typical maximum communication range for NFC data transmission is 20 cm because the respective communication counterpart is located in the near-field of the transmitter antenna. The NFC interface has a transmitter and a receiver that are alternately connected to an antenna, preferably designed as a large-surface coil or conductor loop. During communication, the individual NFC interfaces can take on different functions, i.e. that of an NFC initiator (master device) or an NFC target (slave device). Communication is typically started by the NFC initiator.

NFC communication distinguishes between two different operational modes, referred to as an "active" and "passive" mode. In order to transmit data between two NFC interfaces in active mode, at first one of the NFC interfaces activates its transmitter and thus works as the NFC initiator. The high-frequency current that flows in the antenna induces an alternating magnetic field that spreads around the antenna loop. Part of the induced magnetic field moves through the antenna loop of the other NFC interface which is located close by. A voltage is induced in the antenna loop and can be detected by the receiver of the other NFC interface. If the NFC interface receives signals and the corresponding commands of an NFC initiator, this NFC interface automatically adopts the roll of an NFC target.

For data transmission between the NFC interfaces, the amplitude of the emitted magnetic alternating field is modulated (ASK modulation), similar to the data transmission between an RFID reader and transponder. The transmission direction is reversed in order to send data from the NFC target to the NFC initiator. This means that the NFC target activates the transmitter and the NFC initiator switches to receiving mode. Both NFC interfaces alternately induce magnetic fields where data is transmitted from transmitter to receiver only. In the passive mode, the NFC initiator also induces a magnetic alternating field for transmitting data to the NFC target. The field's amplitude is modulated in line with the pulse of the data to be transmitted (ASK modulation). However, after having transmitted a data block, the field is not interrupted, but continues to be emitted in an unmodulated way. The NFC target now is able to transmit data to the NFC initiator by generating a load modulation. The load modulation method is also known from RFID systems.

Using this method for NFC interfaces provides a number of advantages and for practical operation. The different roles of the two NFC interfaces within the NFC communication can be negotiated and changed at any time. An NFC interface with a weak power supply, e.g. with a low-capacity battery, can negotiate and adopt the role of the NFC target in order to save power by transmitting data via load modulation. The NFC interface that is the target is also able to establish, in addition to other NFC interfaces, the communication to compatible passive transponders (e.g. according to ISO/IEC 14443) that the NFC target supplies with power and that, via load modulation, can transmit data to the NFC interface. This option enables electronic devices equipped with NFC interfaces, such as NFC mobile phones, to read and write on different transponders. As the NFC interface in this case behaves similar to an RFID reader, this option is also called 'reader mode' or 'reader-emulation mode'.

If an NFC interface is located close to a compatible RFID reader (e.g. according to ISO/IEC 14443), the NFC reader is also able to communicate with a reader. Here, the NFC interface adopts the roll of an NFC target and can transmit data to the reader using load modulation. This option enables RFID readers to exchange data with an electronic device with NFC interface, such as NFC mobile phones, allowing the electronic device to behave like a contactless smart card. Additionally, an NFC device can communicate in a peer-to-peer mode (ISO 18092), allowing two NFC-enable devices to establish a bi-directional connection to exchange data. To establish a connection, a client (NFC peer-to-peer initiator) searches for a host (NFC peer-to-peer target) to set up a connection. Then, the NFC Data Exchange Format (NDEF) is used to transmit the data.

Figure 6:
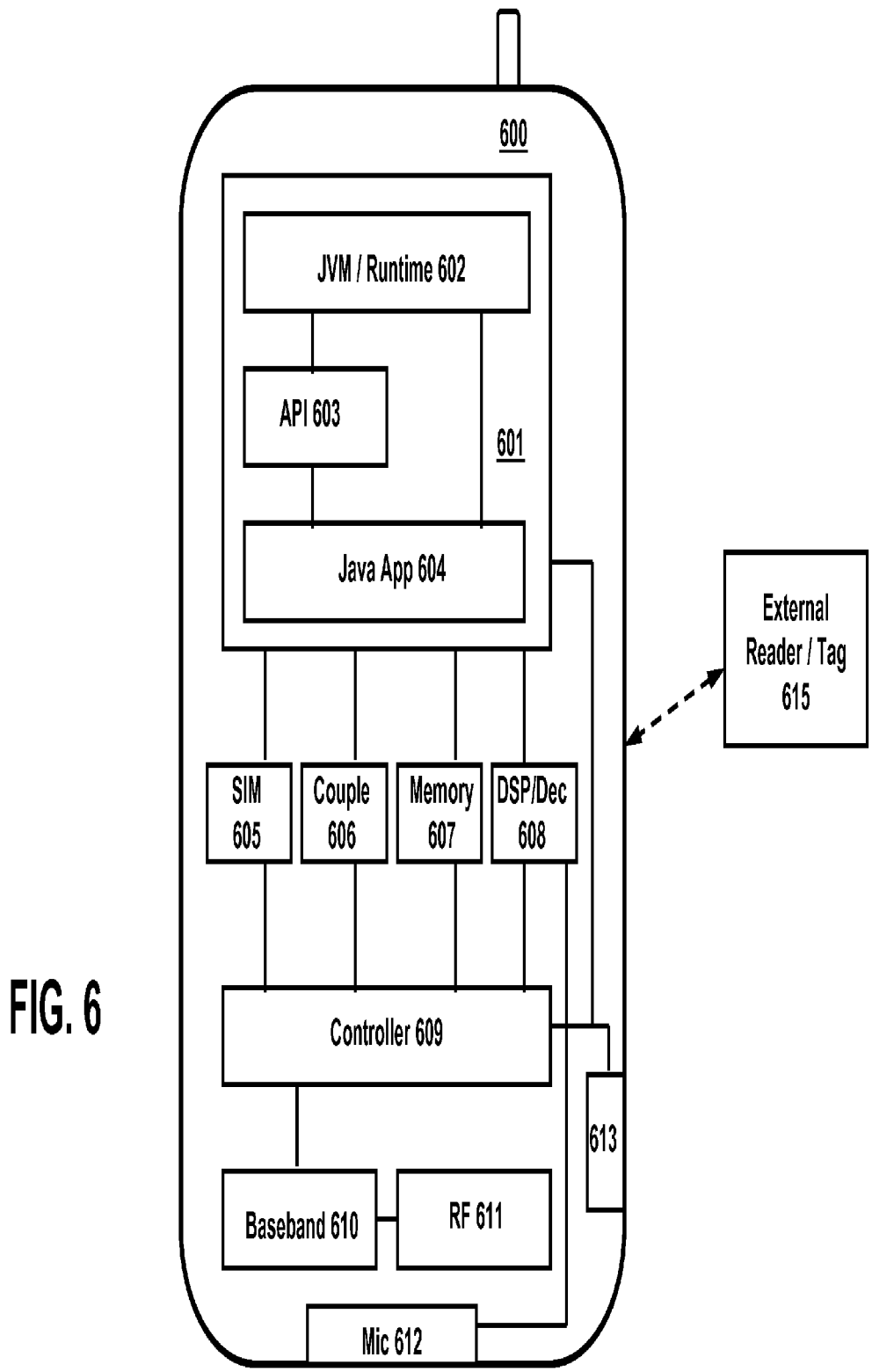
FIG. 6 illustrates an exemplary device configured to perform inductive coupling with an external reader or tag.

Turning to FIG. 6, an exemplary portable computing device 600 is illustrated having media measurement and inductive coupling capabilities. Microphone 612 is configured to capture ambient audio, where digital signal processor/decoder 608 is configured to detect ancillary codes and/or signatures with the assistance of application processor 601. The detected codes and/or signatures are then stored in memory 607. RF unit is capable of receiving voice and/or data communication, while baseband processor 610 manages all the radio functions which may include Wi-Fi and/or Bluetooth, and may be configured with its own RAM and firmware (not shown). Induction controller 609 may comprise a host interface, a microprocessor, a contactless UART (universal asynchronous receiver transmitter), and handles data control from antenna 613, which further communicates with external reader/tag 615. SIM card 605 may contain data about the device and the user, and may further store applications for controller 609. Controller applications may also reside in a secure area in memory 607. Under one embodiment, communications between controller 609 and SIM 605 occur via single wire protocol (SWP).

Inductive coupler module 606 controls transmission of application data (APDU, described in ISO/IEC 1443-4), and, under another embodiment, may be incorporated into application processor 601, and/or also may be integrated with antenna 613 in a "smart card" type configuration. Coupler module 606 and SIM card 605 communicate with application processor 601 preferably utilizing APDUs. Transmitted APDU can contain any desired data, such as command and response. The structure of this protocol is described further in ISO/IEC 7816-3. Application processor 601 comprises a Java virtual machine (JVM), which is a virtual machine capable of executing Java bytecode from Java applications 604. Typically, source code is compiled to Java bytecode, which is verified, interpreted or JIT-compiled for the native architecture of device 600. The Java APIs and JVM together make up the Java Runtime Environment. JVM 606 communicates with APIs 603, which may contain APIs for contactless communication (JSR-257), security and trust services (JSR-177), and others known in the art.

Turning to FIG. 7, an exemplary process is described for associating inductively-coupled portable computing devices (e.g., 102-104) to exposed media data. At the start 705, media data is received 706 in a device (101, 106, 107) that may be in proximity to a portable computing device. The receipt of media data may be initiated via the start of a web session, detection of ancillary code(s), and/or audio signature formation, wherein research data is collected 707 for any of the aforementioned formats. In step 708 the device receiving media data detects whether a portable computing device is inductively coupled. If so, the portable computing device transfers data 709 indicating its presence, and may transfer additional data pertaining to the device and/or user. This data is then time stamped and stored. When a predetermined amount of time has lapsed, or if media data is no longer being received, or if different media data is received, the produced research data is processed together with the data received from the inductive coupling to link the device (user) with the research data, which is ultimately used (e.g., in collection server 108) to determine and/or confirm that a specific user was present when media data was received.

If, in step 708, it was determined that no device was inductively coupled, research data continues to be generated in 711. The process continues where, if further media data is being received, research data continues to be produced 711. If, no further media data is being received (or, if a predetermined period of time has expired, indicating the end of a session), a message is presented 713 indicating that the media data is ended. Under a preferred embodiment, message 713 contains a request to inductively couple. This embodiment is particularly advantageous when a portable computing device is inadvertently left outside the communication range of a device presenting media data. In 714, detection is made to see if a device inductively couples after the message. If no device is coupled, the process ends 715 and the research data is sent for further processing and for the generation of media exposure reports. If, however a device inductively couples at this point, the research data gets associated with the coupled device. Under one embodiment, the coupled device receives full research data credit for being exposed to the media throughout the entire media session, under another embodiment, the coupled device receives partial research data credit for the research session; the partial credit may be based on a predetermined time period, or may comprise a predetermined fraction (e.g., 50%). Such a configuration provides great flexibility for researchers to measure and credit media data exposure for the purposes of producing research data reports.

There is additional flexibility in presenting message 713. In embodiments where computer processor devices are used, the message may be a text message, image, video, audio, etc. presented on the device, instructing the user to inductively couple. Similarly, televisions, set-top boxes, media boxes and the like could present messages similarly to computer processing devices. In embodiments where a radio presents media data, the radio may be equipped with communications software allowing it to communicate the coupling message wirelessly (e.g., Wi-Fi, Bluetooth) to a portable computing device. Under another embodiment, the inductive coupling message may be triggered on the portable computing device via ancillary code embedded in the audio. When the ancillary code containing a message command is detected on a portable computing device, where the device automatically executed messaging software to presents the message on the device.

Furthermore, devices 102-104 may transmit research data and/or media data-related information to each other in a peer-to-peer fashion. The information may include data generated and/or received via inductive coupling. This configuration is particularly advantageous when multiple portable computing devices are part of a household, and household media exposure (in addition to individual exposure) is being monitored.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient and edifying road map for implementing the described embodiment or embodiments. It should be understood that various changes can be made in the function and arrangement of elements without departing from the scope of the invention and the legal equivalents thereof.

What is claimed is:

1. A first device comprising:
a memory including instructions; and
a processor to execute the instructions to:
collect research data relating to media received in the first device;
present a message requesting communicative coupling of a portable computing device to the first device when the portable computing device is not inductively coupled to the first device;
receive information from the portable computing device via an inductive connection when it is detected that the portable computing device is coupled to the first device; and
associate the information to the research data.

2. The first device of claim 1, wherein the media includes at least one of a web page, audio, video, text or an image.

3. The first device of claim 1, wherein the research data includes at least one of a cookie, a code detected from an audio portion of the media, or an audio signature generated from the audio portion of the media.

4. The first device of claim 1, wherein the processor is to execute the instructions to, when no portable computing device is inductively coupled, continue to collect the research data until at least one of (a) a threshold amount of time has expired, (b) media is no longer being received in the first device, or (c) different media is received in the first device.

5. The first device of claim 1, wherein the information from the portable computing device is indicative of a user being proximate to the first device when the media was received in the first device.

6. The first device of claim 1, wherein the information from the portable computing device is received using at least one of full-duplex communication, half-duplex communication or sequential communication.

7. The first device of claim 1, wherein the information from the portable computing device includes an identifier of the portable computing device.

8. The first device of claim 1, wherein the first device is a computer.

9. The first device of claim 1, wherein the research data includes a cookie associated with accessing the media, and the information from the portable computing device is indicative of a user of the portable computing device.

10. A storage device comprising instructions that, when executed, cause a first device to at least:
collect research data relating to media received in the first device;
present a message requesting communicative coupling of a portable computing device to the first device when the portable computing device is not inductively coupled to the first device;
receive information from the portable computing device via an inductive connection when it is detected that the portable computing device is coupled to the first device; and
associate the information to the research data.

11. The storage device of claim 10, wherein the media includes at least one of a web page, audio, video, text or an image.

12. The storage device of claim 10, wherein the research data includes at least one of a cookie, a code detected from an audio portion of the media, or an audio signature generated from the audio portion of the media.

13. The storage device of claim 10, further including instructions that when executed, cause the first device to, when no portable computing device is inductively coupled, continue to collect the research data until at least one of (a) a threshold amount of time has expired, (b) media is no longer being received in the first device, or (c) different media is received in the first device.

14. The storage device of claim 10, wherein the information from the portable computing device identifies a user being proximate to the first device when the media was received in the first device.

15. The storage device of claim 10, wherein the information from the portable computing device is received using at least one of full-duplex communication, half-duplex communication or sequential communication.

16. The storage device of claim 10, wherein the information from the portable computing device includes information identifying the portable computing device.

17. The storage device of claim 10, wherein the first device is a computer.

18. The storage device of claim 10, wherein the research data includes a cookie associated with accessing the media, and the information from the portable computing device is indicative of a user of the portable computing device.

19. A method comprising:
collecting research data relating to media received in a first device, the research data including a cookie associated with accessing the media;
when a portable computing device is not inductively coupled to the first device, presenting a message via a processor to request communicative coupling of the portable computing device to the first device;
receiving information from the portable computing device via an inductive connection when it is detected that the portable computing device is coupled to the first device, the information indicative of a user of the portable computing device; and
associating the information to the research data.

20. The method of claim 19, wherein the media includes at least one of a web page, audio, video, text or an image.

21. The method of claim 19, wherein the research data further includes at least one of a code detected from an audio portion of the media, or an audio signature generated from the audio portion of the media.

22. The method of claim 19, further including, collecting the research data until at least one of (a) a threshold amount of time has expired, (b) media is no longer being received in the first device, or (c) different media is received in the first device.

23. The method of claim 19, wherein the information from the portable computing device is received using at least one of full-duplex communication, half-duplex communication or sequential communication.

24. The method of claim 19, wherein the information from the portable computing device is an identifier corresponding to the portable computing device.

25. The method of claim 19, wherein the information from the portable computing device is indicative of the user being proximate to the first device when the media was received in the first device.

26. The method of claim 19, wherein the first device is a computer.

* * * * *